(12) United States Patent
Stephenson et al.

(10) Patent No.: US 8,521,311 B2
(45) Date of Patent: *Aug. 27, 2013

(54) ASYMMETRICAL PROCESS PARAMETER CONTROL SYSTEM AND METHOD

(75) Inventors: Brian Kent Stephenson, Georgetown, TX (US); David G. Hoch, Falmouth, ME (US); L. Paul Collete, III, Westminster, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/252,052

(22) Filed: Oct. 3, 2011

(65) Prior Publication Data

US 2012/0023061 A1    Jan. 26, 2012

Related U.S. Application Data

(63) Continuation of application No. 12/242,431, filed on Sep. 30, 2008, now Pat. No. 8,032,236.

(51) Int. Cl.
*G06F 19/00* (2011.01)

(52) U.S. Cl.
USPC .............................. 700/33; 700/127

(58) Field of Classification Search
USPC ........................ 700/33, 35, 40, 127
See application file for complete search history.

(56) References Cited

U.S. PATENT DOCUMENTS

| | | | |
|---|---|---|---|
| 4,228,775 A | 10/1980 | Schweikert | |
| 4,474,154 A | 10/1984 | Henning et al. | |
| 5,150,289 A * | 9/1992 | Badavas | 700/34 |
| 5,950,668 A | 9/1999 | Baumann | |
| 8,032,236 B2 * | 10/2011 | Stephenson et al. | 700/33 |
| 8,285,513 B2 * | 10/2012 | Emigholz | 702/179 |
| 2010/0121473 A1 * | 5/2010 | Ding et al. | 700/104 |

* cited by examiner

*Primary Examiner* — Ryan Jarrett
(74) *Attorney, Agent, or Firm* — Fletcher Yoder, P.C.; William R. Walbrun; John M. Miller

(57) ABSTRACT

A technique is disclosed for asymmetrically controlling a process parameter based upon the direction of a prediction error between a predicted value determined using an inferential model and a laboratory measurement of the parameter. The present technique provides for the adaptive biasing of the predicted value based upon the direction of the prediction error. In one embodiment, a biasing factor may be determined by filtering the prediction error, such that the prediction error is emphasized more heavily in the biasing factor if the prediction error is in a less tolerable direction and emphasized less heavily if the prediction error is in the opposite direction. The biasing factor may further be determined as a function of a previous biasing factor computed during the process. Asymmetric control of the process parameter may be performed by controlling the parameter using model predictive control techniques based on the biased predicted values of the parameter.

23 Claims, 7 Drawing Sheets

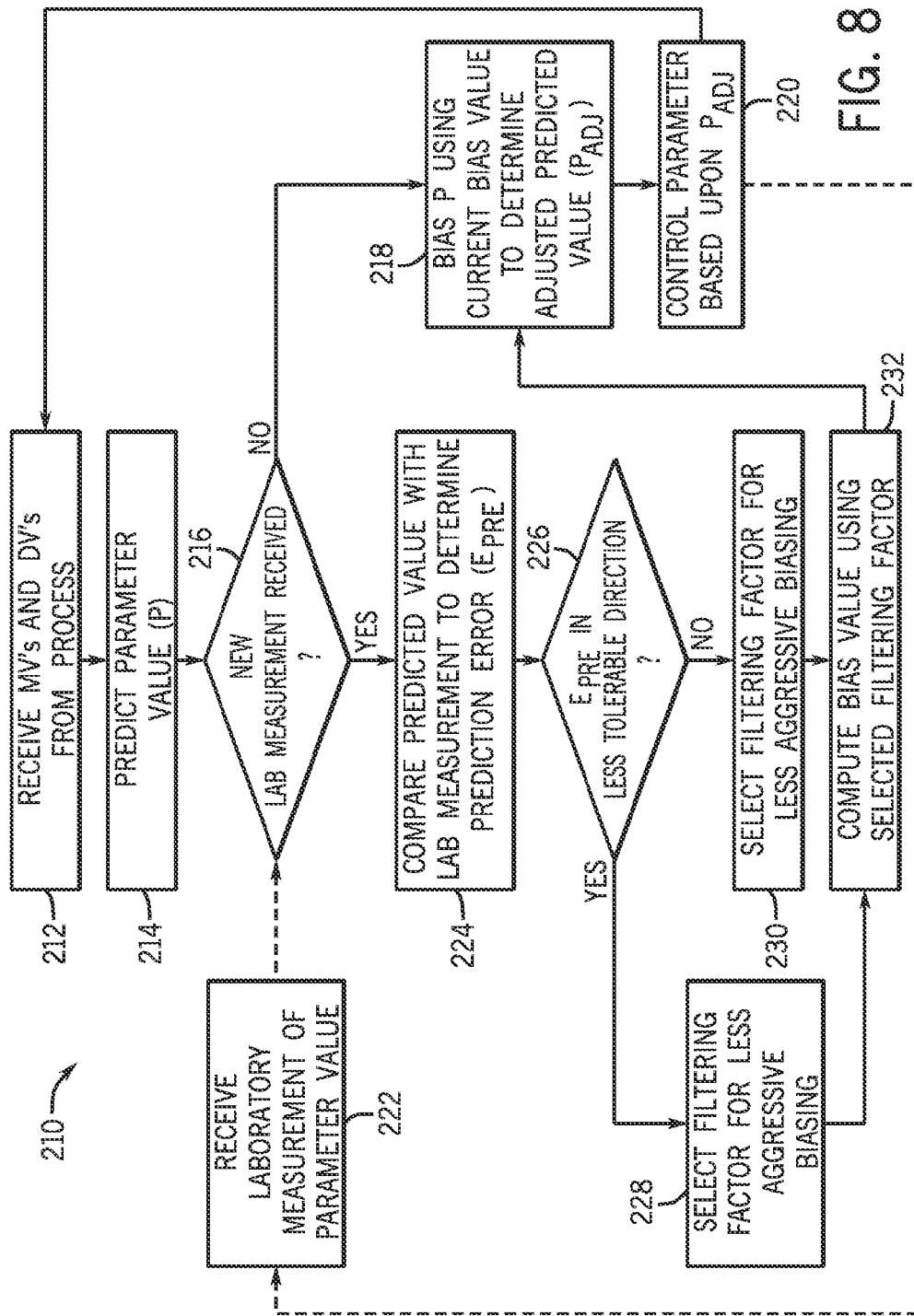

ASYMMETRICAL PROCESS PARAMETER CONTROL SYSTEM AND METHOD

CROSS REFERENCE TO RELATED APPLICATIONS

This application is a Continuation application of U.S. patent application Ser. No. 12/242,431, entitled "Asymmetrical Process Parameter Control System and Method", filed Sep. 30, 2008, which is herein incorporated by reference.

BACKGROUND

The present invention relates generally to process control systems and, more particularly, to model predictive control of one or more asymmetrical process parameters in a process.

Manufacturing processes typically share the common goal of ensuring that a resulting product conforms to certain target quality specifications. In controlling a process in this regard, a determination as to whether a resulting product conforms to a particular quality standard may be indicated by one or more quality parameters derived or measured during the process. In some instances, these quality parameters may be measured online by using one or more measurement devices, such as sensors, transducers, or the like. Thus, using measured quality parameter values, a control system may be able to adjust one or more process variables of the manufacturing process in order to maintain the quality parameter at a desired target value (e.g., a set point, range, or maximum, etc.).

In some processes, certain quality parameters may not be directly measurable using conventional sensors and measuring devices. For example, in a paper manufacturing process, certain quality parameters of a finished paper product, such as a paper strength property, are typically only measurable by taking a sample of finished paper and performing various destructive tests in a testing setting that is separate from the process, such as in a dedicated or automated testing system, through one or more laboratory-based tests or measurements, or by other offline product testing arrangements (e.g., including offline sensors not in direct communication with the process system). These samples are normally taken when a reel of finished paper is removed from the paper machine. Thus, these "off-process" measurements may not be available for use in the process for control purposes during the production of the reel from which the measurement is obtained.

One solution for providing closed loop control of a parameter that cannot be directly measured while a process is running is through the use of one or more inferential models configured to provide a predicted value of the parameter. The predicted values which may be used by a dynamic predictive control model to control one or more manipulated variables (MV's) of the process in order to drive the predicted values produced by the inferential model towards a desired target set point or range of acceptable values. Generally, the inferential model differentially determines a predicted or estimated value for the parameter based upon relationships between one or more MV's and/or disturbance variables (DV's) of the process. As will be appreciated, MV's are those variables which can be controlled by a controller in order to achieve the targets or goals indicated by controlled variables (CV's) which the controller tries to bring to some objective (e.g., to a target set point, maximum, etc.). DV's may be regarded as those variables which may affect the resulting objective parameter (e.g., paper quality parameter), but that the controller may not be able to regulate.

While the use of inferential models in measuring such parameters provides a baseline for closed loop control, mismatches between the predicted value and an actual value of the parameter (e.g., laboratory measurement) may occur due to imperfections in the modeling algorithms, unmeasured disturbances and, in some cases, immeasurable disturbances in the process system. Accordingly, a prediction error may be determined by comparing the predicted value of the parameter with a corresponding off-process measurement taken from a sample of a finished product. This prediction error may be used to compute a biasing factor that is used to bias the predicted values provided by the inferential model, thus producing an adjusted predicted value of the quality parameter which may be used by a dynamic predictive control model to determine the appropriate control actions required for driving the parameter towards the target set point. However, the use of the off-process measurements themselves is not without drawbacks. For example, in many cases, off-process measurements have their own disturbance characteristics due to inconsistencies or human/machine errors in performing or obtaining measurements. Often times, measurements taken from multiple samples obtained from the same sheet of paper may produce different measurements. Thus, off-process measurements are often filtered such that a biasing factor used in adjusting the predicted values from the inferential model may only reflect a portion of the prediction error.

Still further, certain processes parameters may have asymmetrical characteristics with a limit imposed more strictly in one direction than the opposing direction. For example, in the case of a paper strength parameter, an asymmetrical characteristic may be that the paper product must at least meet a certain strength value. If the paper fails to meet at least the target strength value, the paper may be rejected as being unmarketable, thus resulting in a loss of return on all operation costs associated with producing the rejected product. However, if the paper exceeds the specified strength value, this deviation may be acceptable, though not necessarily optimal in terms of production costs, for example. That is, the marginal cost of producing a product that exceeds a target specification is often preferable to producing a rejected product that fails to even satisfy the minimum acceptable specifications. Accordingly, there exists a need for a technique to adaptively control an asymmetrical process parameter based on laboratory measurements to correct for prediction mismatches more quickly in a particular direction.

BRIEF DESCRIPTION

Embodiments of the present invention provide a technique for asymmetric control of a process parameter in a control system. The technique may be used in any suitable control system, including those used in industrial applications, commercial applications, vehicles, manufacturing applications, and so forth.

The present technique generally provides for the adaptive biasing of a prediction error between a laboratory measurement and a predicted value of an asymmetrical parameter. As used herein, it should be understood that an asymmetrical parameter refers to a parameter having a limit imposed more strongly in one direction than another. For instance, in the context of a paper manufacturing process, various strength parameters may be defined in such a manner that a paper product must at least meet a certain strength in order to satisfy a target quality requirement. That is, paper that is stronger than the minimum target, though not necessarily optimal, may still be acceptable. For instance, the marginal additional costs incurred by producing a product that exceeds the required specifications may be preferable as opposed to the expenses incurred in manufacturing a rejected product that fails to meet the quality targets.

In accordance with the present technique, based upon the direction of a prediction error, a filtering factor may be selected. In particular, the asymmetric control technique may provide for a higher filtering factor if the prediction error is determined to be in a less tolerable direction. For instance, referring to the paper manufacturing scenario discussed above, if the prediction error indicates that the off-process measurement is lower than the predicted value, a higher filtering factor is selected. If the prediction error is indicates that the off-process measurement of the paper strength is higher than the predicted value, a lower filtering factor is selected. The filtering factor and the prediction error may be used to compute a biasing factor. Where the prediction error is in the less tolerable direction, the error may be reflected more heavily in the biasing factor due to the use of a higher filtering value. Conversely, where the prediction error is in the opposing direction, the error may be less emphasized in the biasing factor due to the lower filtering value. Further, in certain implementations, the calculation of the biasing factor may further be based upon a function of a historical biasing value. Overall, the application of the techniques described herein may thus advantageously provide a mechanism for adaptively correcting asymmetric process parameters, such that predictive measurement mismatches in one direction (e.g., a less tolerable direction) may be adapted more quickly than mismatches in the opposing direction.

DRAWINGS

These and other features, aspects, and advantages of the present invention will become better understood when the following detailed description is read with reference to the accompanying drawings in which like characters represent like parts throughout the drawings, wherein:

FIG. 8 illustrates exemplary logic for carrying out the present technique for controlling an asymmetric process parameter.

DETAILED DESCRIPTION

Figure 1:
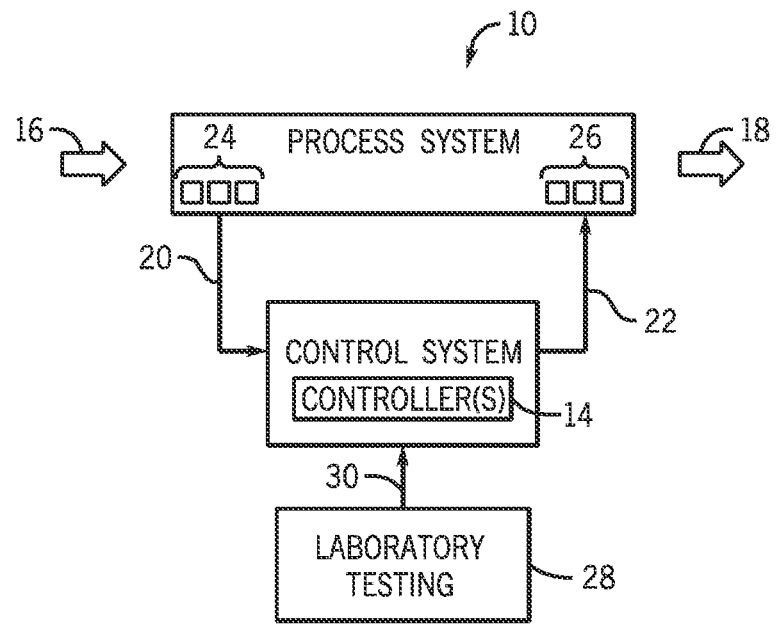
FIG. 1 is a diagrammatical representation of a process system equipped with a control system having one or more controllers and designed to implement the present technique.

Turning now to the drawings, and referring first to FIG. 1, a process system 10 is illustrated that is at least partially regulated by a control system 12 having one or more controllers 14. As will be appreciated by those skilled in the art, the process system 10 may be any conceivable type of process, such as a manufacturing process, a steady state or batch process, a chemical process, a material handling process, an energy production process, and so forth. In an exemplary embodiment, as will be described in further detail below with reference to FIG. 3, the process system 10 may be implemented in the context of a paper manufacturing process.

In general, the process system 10 of FIG. 1 may receive one or more inputs 16, and produce one or more outputs 18. By way of example, in complex processes found in the industry, many such inputs may be utilized, including feed stocks, raw materials, electrical energy, fuels, parts, assemblies and sub-assemblies, and so forth. The outputs 18 may include finished products, semi-finished products, assemblies, manufacturing products, by products, and so forth. Based upon the system dynamics, the physics of the system and similar factors, the control system 12, may regulate operations of the process system 10 in order to control both the production of the outputs as well as quality of the outputs, and so forth.

In the illustrated embodiment, the control system 12 may perform control functions 22 in response to process information 20 received from the process system 10. For instance, the process information 20 may be provided by one or more sensors 24 configured to detect and/or measure certain parameters of the process system 10, which may include measurements representative of both MV's, DV's, and CV's. In general, such sensors 24 may include measurement devices, transducers, and the like that may produce discrete or analog signals and values representative of various variables of the process system. The sensors 24 may be coupled to the one or more controllers 14 of the control system 12. In practice, many such sensors and more than one controller 14 may be provided in the control system 12. Such sensors 24 commonly produce voltage or current outputs that are representative of the sensed variables. The process information 20 may represent "on-process" measurements of various parameters obtained directly from the process (e.g., using the sensors 24). As used herein, the terms "on-process measurements" or "online measurements" or the like shall be understood to refer to measurements of process parameters acquired directly from the process system 10. Additionally, the process information 20 may also include controllable and external operating constraints, as well as user-specified set points. The process information 20 may also include controllable and external operating constraints, as well as user-specified set points, for example.

The control system 12 or other signal processing circuitry may develop or derive values for certain system parameters based upon a predictive control model, which may define mathematical relationships between the measured values and those desired parameters. Such inference may be particularly useful where control is desired based upon particular system parameters that are impossible or difficult to detect. The present technique for model predictive control may thus employ virtual sensors, such as a Virtual Online Analyzer® (VOA) available from Pavilion Technologies, Inc., of Austin, Tex., that effectively operate as a sensor by differentially determining certain desired variables for control purposes. Further, in some embodiments, the control actions may be determined using a dynamic predictive model which may not only be adapted to control quality targets, but may also take cost considerations (e.g., based on a cost function) into account.

Figure 2:
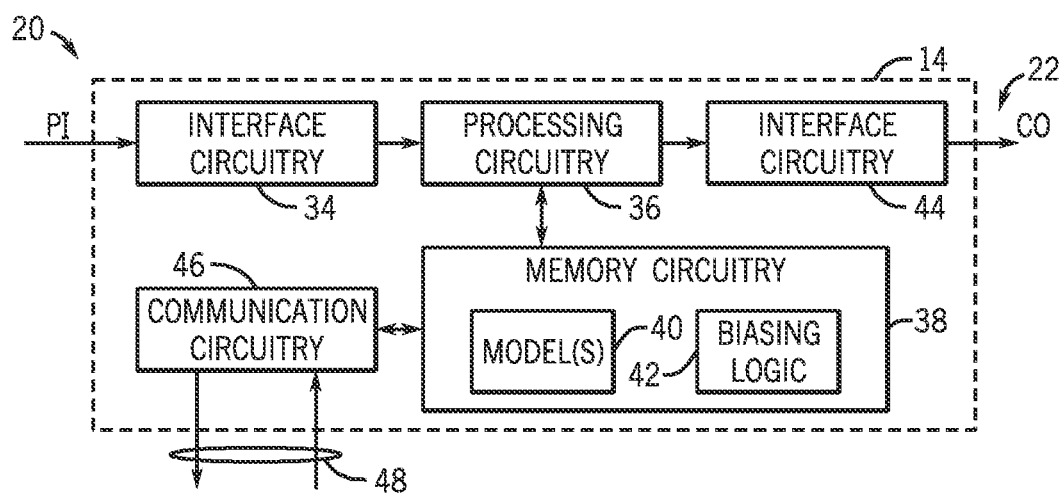
FIG. 2 is a diagrammatical representation of certain functional components which may be included a controller of FIG. 1.

FIG. 2 illustrates certain exemplary components that may be included in a controller 14 of the type illustrated in FIG. 1, which may be configured to implement various model predictive control techniques. Many other components may be included in the controller 14 depending upon the system design, the type of system controlled, the system control needs, and so forth. In the illustrated embodiment, the interface circuitry 34 receives process information 20 which, as discussed above, may include values or signals obtained using the sensors 24. The interface circuitry 34 may include filtering circuitry, analog-to-digital conversion circuitry, and so forth. The interface circuitry 34 is in data communication with the processing circuitry 36, which may include any suitable processor, such as a microprocessor, a field programmable gate array, and so forth. The processing circuitry 36 may carry out control functions and, in the present embodiment, may perform model predictive control functions based upon knowledge of certain aspects of the process system 10. By way of example, the processing circuitry 36 may execute one or more model predictive control algorithms to develop values for the controlled variable, including forward-looking trajectories for MV's and CV's. Such algorithms, as illustrated herein, may be defined by one or more control models 40 stored in a memory circuit 38 communicatively coupled to the processing circuitry 36. In practice, the one or more control models 40 may include a plurality of control models operating in cooperation to achieve a particular control objective. The memory circuit 38 may include biasing logic, represented here by the reference number 42, which may be configured to provide for the asymmetric control of one or more process parameters, as will be discussed further below. The memory circuit 38 may also include control routines executed by the processing circuitry 36, as well as store certain desired variables, variable settings, set points, and so forth, as will be appreciated by those skilled in the art.

The processing circuitry 38, based upon the control algorithm or algorithms defined in the one or more models 40 and the biasing logic 42, may output signals to the interface circuitry 44 that may be used to drive the actuators 26 of the process system 10 of FIG. 1. The interface circuitry 44 may include various driver circuits, amplification circuits, digital-to-analog conversion circuitry, and so forth. That is, based upon the process information 20 received (which may include measured or inferred values of the MV's or CV's), the controller 14 may determine appropriate control actions or outputs based on the variable relationships, constraints, and/or objectives defined by the control models 40. The controller 14 may also include communications interface circuitry 46. By way of example, the communications interface circuitry 46 may include networking circuitry configured to network the controller 14 with other controllers that may be implemented in the control system 12, as well as with remote monitoring and control systems, for instance. Further, the communications interface circuitry 46 may also network the controller 14 with the laboratory testing facility 28 shown in FIG. 1 for receiving laboratory data 30 representing the measurements of certain process parameters. Particularly, these laboratory measurements 30 may represent the measured values of parameters not directly measurable during the period in which the product 18 is being produced by the process system 10, and may be obtained or measured by performing one or more destructive testing procedures on a sample of the finished product 18. While this component has been referred to herein as a "laboratory testing facility" for purposes of the present discussion, it should be understood that the offline testing arrangement represented by the reference numeral 28 may include any conceivable type of testing arrangement capable of obtaining and providing off-process measurements of process parameters, including automated or dedicated testing equipment, offline sensors, to name just a few. As used herein, the terms "off-process measurements" or "offline measurements" or the like shall be understood to refer to measurements of process parameters acquired in such settings which are separate from the process system 10.

As mentioned above, due to a limited number of data points that may be provided by the laboratory testing facility 28, the models 40 implemented by the controller 14 may include one or more inferential models configured to compute predicted values for the process parameter. These predicted values may be utilized by a dynamic predictive control model to control the process parameter. As will be appreciated, inferential models may be configured to differentially determine a predicted value for the parameter based upon the defined relationships between one or more measured variables provided by the process information inputs 18, which may include the values of MV's and/or DV's of the process system 10. That is, an inferential model effectively provides a virtual sensor. In a presently contemplated embodiment, a virtual sensor implementing an inferential model may be provided as a Virtual Online Analyzer® available from Pavilion Technologies, Inc., of Austin, Tex. Further, it should be understood that basis for such control system designs may include parametric models, neural network models, linear and non-linear models, to name only a few.

The biasing logic 42 may determine a biasing factor using the known laboratory measurements 30 to bias the predicted value, thus producing an adjusted predicted value that may be utilized by the dynamic predictive model to implement the required control actions for controlling the parameter. As will be discussed in further detail below, where the controlled parameter is defined asymmetrically, such as having an imposed limit in one direction, the biasing logic 42 may be configured to adaptively bias predicted parameter values generated by one or more inferential models more aggressively in the limited less tolerable direction.

Figure 3:
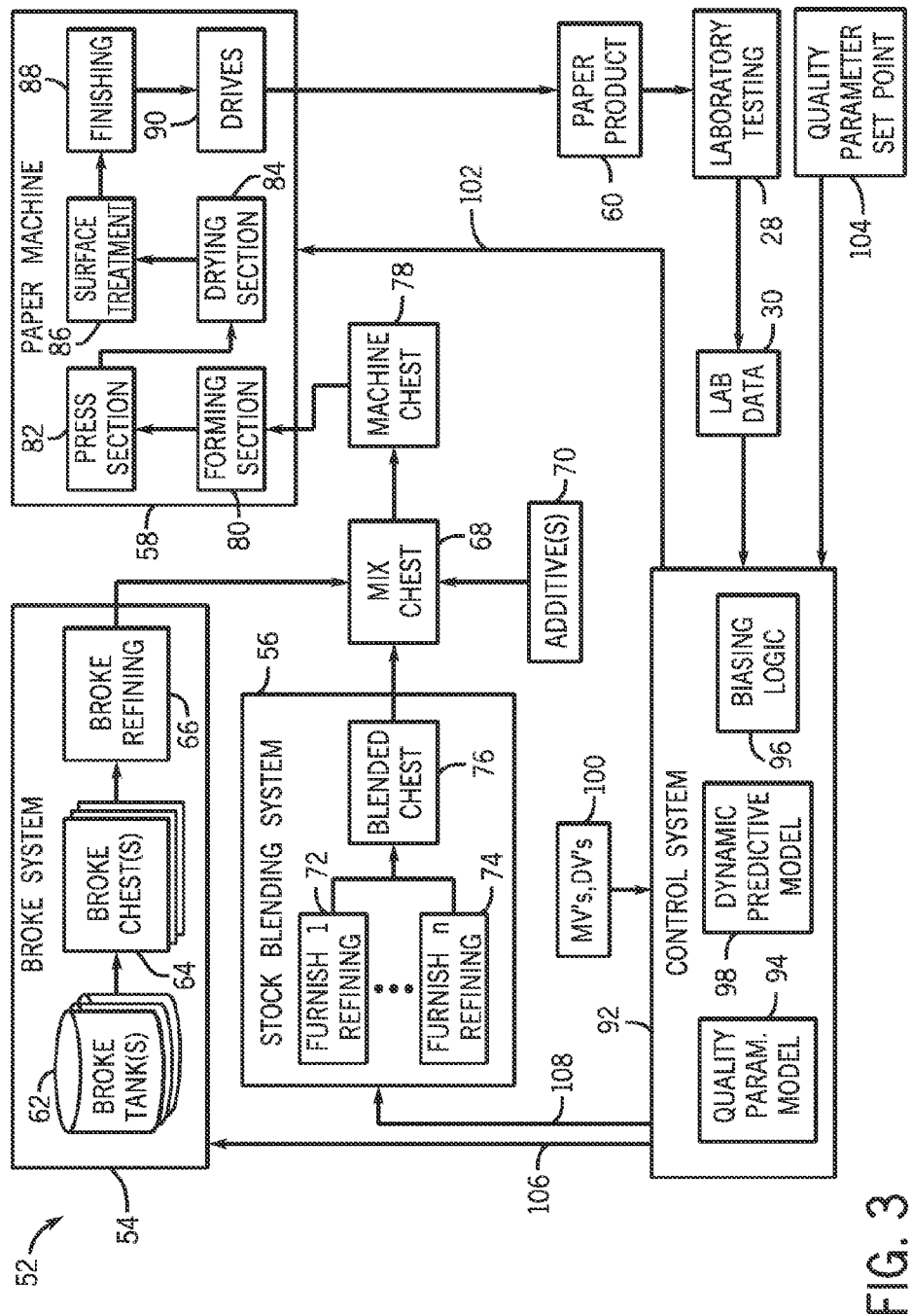
FIG. 3 is a diagrammatical representation of a paper manufacturing plant equipped with a control system including a plurality of control models and biasing logic that may collectively provide for control of an asymmetrical parameter of the paper manufacturing process in accordance with the present technique.

As mentioned above, the present control techniques may be particularly applicable for controlling an asymmetric quality parameter in a continuous paper manufacturing process, as shown in FIG. 3 and generally designated by the reference numeral 52. Several quality parameters in paper processing may be characterized as having asymmetrical characteristic. For instance, various strength parameters may be defined such that a paper product produced by the paper manufacturing process 52 must meet at least a certain strength level. By way of example, one such parameter may be an internal bond strength parameter, such as Scott bond. As will be understood by those skilled in the art, internal bond measurements are generally used to reflect the internal bond strength of papers made from various pulps. For example, an internal bond strength of a paper product may be measured in units of Joules/meters$^2$ (J/m$^2$). Accordingly, if the internal bond value of a finished paper product fails to meet a certain target threshold, then the product may be rejected as failing to meet a minimum quality guideline for conforming to industry standards with respect to product specifications. However, if the internal bond value exceeds the requisite strength target, such deviations, while not optimal, may be acceptable or tolerable to a certain extent. As will be appreciated, internal bond strength may be influenced by a variety of factors, such as thickness, filler content and the type of fiber used in producing the paper product 60.

The subsequent figures are intended to illustrate a technique for implementing asymmetric control of a paper strength parameter in accordance with an embodiment of the present invention. It should be understood, however, that the illustrated embodiment is intended only to be exemplary, and that the present technique is not necessarily limited to paper manufacturing process. Indeed, as those skilled in the art will appreciate, the present technique may be applicable to various types of process systems in which a controlled parameter is defined as having asymmetrical limits. The illustrated paper manufacturing process 52 may be adapted to produce a paper product 60 and may include a broke system 54, a stock blending system 56, and a paper machine 58. The output of the broke system 54 and additional additives materials, including chemical and filler materials are combined with the output of the stock blending system 56 to generate pulp slurry to be processed by a paper machine 58 for the formation of paper 60, as will be discussed below.

As shown in the present, the broke system 54 may include one or more broke tanks 62 which may store and feed the broke to one or more broke chests 64. Broke from the broke chests 64 may be refined by the broke refining unit 66. The refined broke output of the refining unit 66 is provided to the mix chest 68. Here, additional additives 70, which may include fillers, chemical agents, and starch, may be added to provide certain properties in the paper product. Depending on the specific desired properties of the resulting paper product, a number of additives may be incorporated here or at other locations in the process 52. For example, sizing agents, such as alkylketene dimmer (AKD) or alkylsuccinic anhydrides (ASA) may be added to control the hydrophobicity of the paper product by controlling the amount of water the paper will absorb. For instance, certain paper products adapted for writing may require a relatively slow rate of absorption with regard to the water-based inks that may be used, whereas other paper products used in the cleaning industry are typically engineered to absorb large amounts of water quickly. The filler components may include dyes, clay, talc, and calcium carbonates, for example, which may contribute to the opacity or color characteristics of the paper.

The stock blending system 56 may include various refining units for preparation of a number of refined stock furnishes. In the present embodiment, the stock blending system 56 may include a first furnish refining unit 72 for producing a first furnish stock, though any number of furnish refining units, represented here by the reference number 74, may be provided to produce the necessary stock furnish materials for producing the paper product. These refining units 72-74 may control the fiber development of the stock furnishes that are provided to the blend chest 76. The blend chest 76 output of the stock blending system 56 may then be provided to the mix chest 68 along with the refined broke from the broke system 54 and the additives 70. Once mixed, the contents of the mix chest 76 may be provided to the machine chest 78 prior to being processed by the paper machine 58. The paper machine 58 may include a dilution controlled head box (not shown) through which the contents of the machine chest 78 may be provided to a forming section 80, which may include a wire press, for example. The formed sheets may then be passed through one or more press sections 82 to remove additional water and moisture from the paper before continuing through a series of drying sections 84. The output of the drying sections 84 may the proceed through a surface treatment section 86, a finishing section 88, and one or more drive sections 90. The output of the paper machine 58 may be a finished paper product 60. As will be appreciated, the paper product 60 produced by the paper manufacturing system 52 is commonly stored in reels which may later be apportioned into smaller sizes for distribution to customers (e.g., reams).

The broke system 54 and stock blending system 56 may be at least partially controlled by a control system 94. In the presently illustrated embodiment, the control system 92 may be adapted to provide for the asymmetric control of a paper strength parameter, such as internal bond. As discussed above, because the paper product 60 may be required to meet at least a certain strength target, control may be applied more aggressively when internal bond value is determined to be below the target value and less aggressively when internal bond exceeds the minimum target value. As will be appreciated, the internal bond strength of a sample of paper may be influenced by a variety of factors, such as thickness, filler type or content, fiber type, and surface treatment, among other.

Because internal bond is typically only measurable through destructive testing procedures performed in a laboratory 28, the control system 92 may include an inferential model 94 configured to estimate a raw predicted value for internal bond. To perform the estimation of internal bond, the control system 92 may receive measured values of one or more MV's and/or DV's, referred to here by the reference number 100, from various components of the paper process 52, including one or more of the broke system 54, the stock refining system 56, or the paper machine 58. These process variable values may be measured or derived by the sensors 22 discussed above, which may be provided at various locations in the process 52 to acquire the necessary MV and DV values. Thus, based on the known relationships between the MV and/or DV values 100, the quality parameter model 94 may differentially determine a predicted value for internal bond.

To reduce the amount of error in the predicted internal bond value, which may be caused by unmeasured or immeasurable disturbances in the system 52, the raw internal bond prediction may be biased using a biasing factor determined by the biasing logic 96. The biasing factor may be defined as a function of the prediction error between the raw internal bond prediction from the quality parameter model 94 and a corresponding laboratory measurement 30 of internal bond performed in the laboratory testing facility 28. Though referred to as a "laboratory measurement" in the present example, it should be understood that the off-process measurement represented by the reference numeral 30 could be provided by any suitable off-process testing or measurement procedure, including those provided by automated or dedicated testers, offline sensors, etc. Thus, the raw internal bond prediction may be adjusted using the biasing factor to produce a biased internal bond prediction that may be utilized by the dynamic predictive model 98 which may be configured to, based upon the biased internal bond prediction, generate the appropriate control outputs 102, 106, and 108 from the control system 94 for manipulating various parameters of the paper manufacturing process 52 in order to control internal bond to meet a target set point or range 104. Further, due to the asymmetrical nature of internal bond, as discussed above, the control of internal bond may be emphasized more heavily in the weaker direction compared to the stronger direction. In a particular implementation, the asymmetric control of internal bond may be accomplished by biasing the raw predicted value more aggressively when a prediction error between the raw prediction and the laboratory measurement 30 is in the weaker direction (e.g., the raw predicted value is greater than the laboratory measurement) and less aggressively when the prediction error between the raw predicted value and a laboratory measurement 30 is in the stronger direction (e.g., the raw predicted value is less than the laboratory measurement).

Figure 4:
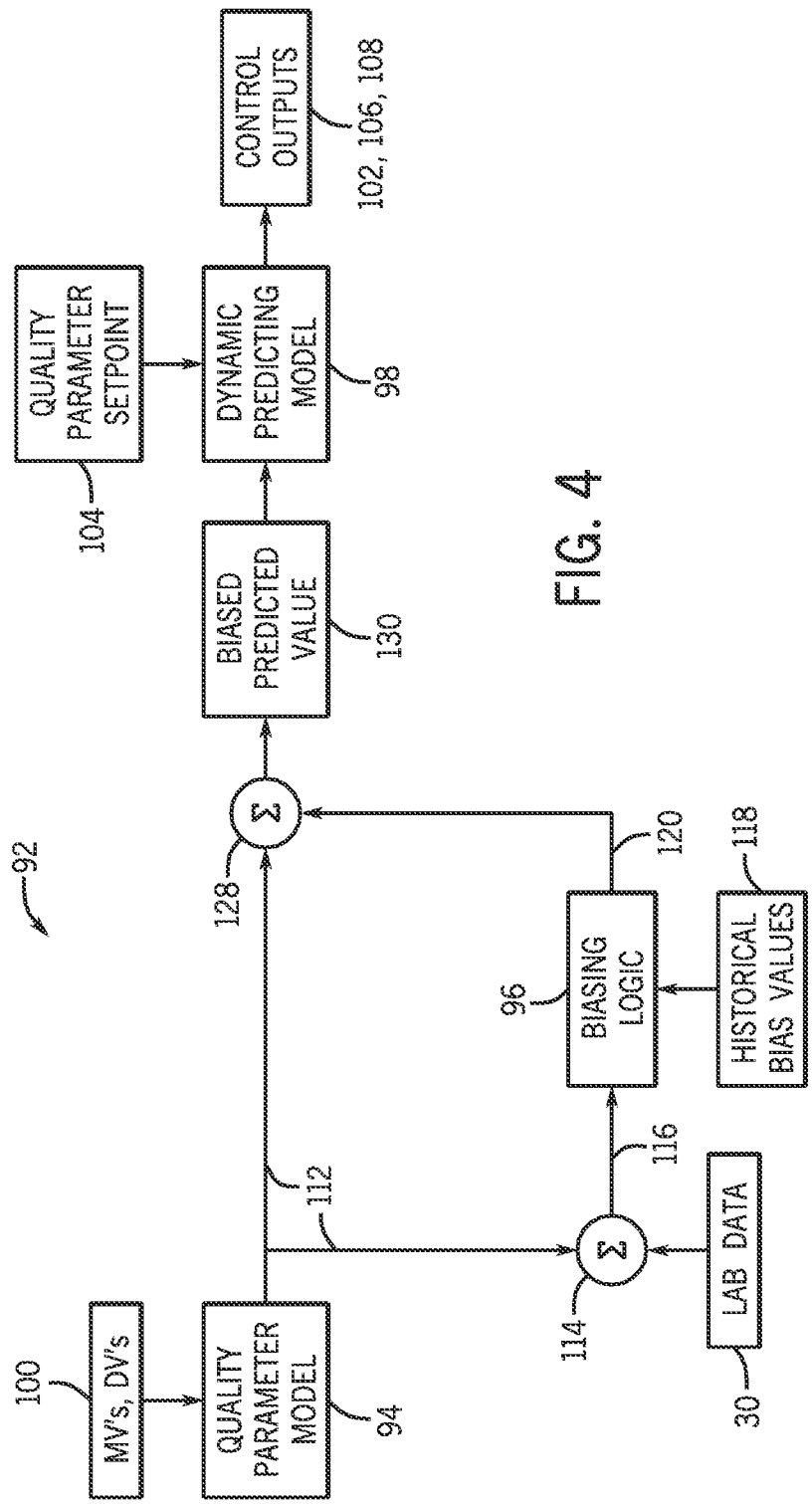
FIG. 4 is a diagrammatical representation depicting a control algorithm that may be carried out by the control models and the biasing logic implemented b the control system of FIG. 3 for controlling the asymmetrical parameter.

The asymmetric biasing control provided by the biasing logic 96 of the above-discussed control system 94 may be better understood with reference to FIG. 4 which provides a diagrammatical representation illustrating the mutual interactions and lines of communication between the quality parameter model 94, the biasing logic 96, and the dynamic predictive model 98. As discussed above, the quality parameter model 94 may derive a predicted or estimated value for internal bond based on various MV's and DV's 100 measured or derived from the process system 52. The quality parameter model 96 may include an inferential model, such as a virtual sensor, configured to differentially derive a raw predicted value for internal bond, referred to here by the reference number 112, based on the received MV and DV values 100.

As shown in the present figure, the raw internal bond prediction 112 is biased using a biasing factor prior to being provided to the dynamic predictive control model 96. In a presently contemplated embodiment, the biasing factor may be determined based upon a prediction error between the raw prediction 112 and a laboratory measurement 30. For example, as shown in the present figure, the raw internal bond prediction 112 and the laboratory internal bond measurement 30 may be evaluated using the summation logic 114 to determine a prediction error 116. Using the prediction error 116 and a historical bias value 118 (which may represent a biasing factor computed using the previous laboratory measurement), the biasing logic 96 may compute the biasing factor 120. Further, depending on the direction of the prediction error, the biasing logic 96 may asymmetrically control the biasing of the raw predicted values 112 by adaptively adjusting the how strongly the prediction error is reflected in the biasing factor 120. For instance, if the prediction error 116 indicates that the raw predicted value 112 is greater than the current laboratory measurement 30, the prediction error 116 may be more heavily emphasized in the biasing factor 120. Conversely, a prediction error 116 indicating that the raw predicted value 112 that less than the current laboratory measurement 30 may be emphasized less heavily in the biasing factor 120. In other words, the present control technique favors controlling internal bond more aggressively if there is an indication that a laboratory measurement is lower than the predicted value (e.g., weaker direction) in order to reduce and/or prevent the production of a product that fails to meet a minimum target specification. As can be appreciated, the marginal cost of producing a product that exceeds a minimum required target specification is often preferable to producing a rejected product.

Figure 5:
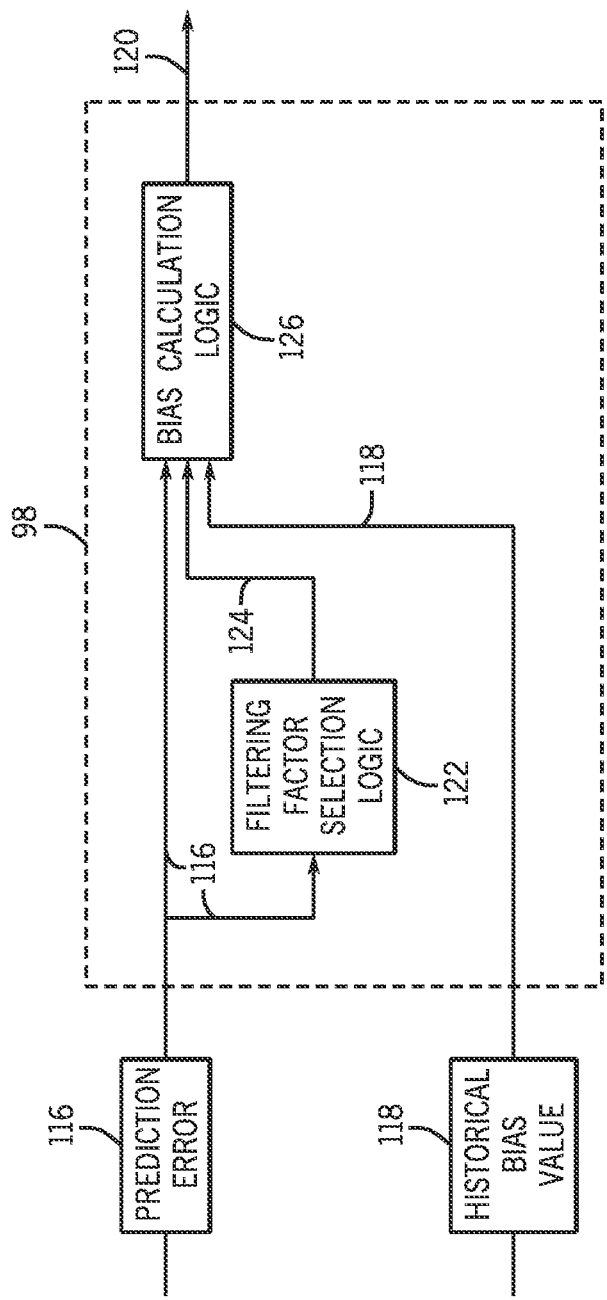
FIG. 5 is a diagrammatical representation of the biasing logic of FIGS. 3 and 4 in accordance with an implementation of the present technique.

Referring briefly to FIG. 5, an exemplary configuration of the biasing logic 96 adapted to carry out asymmetric control of the biasing factor 120 is illustrated in accordance with an embodiment of the present invention. The biasing logic 96 may receive the prediction error 116 and the historical bias value 118 which, as discussed above, may represent a bias value computed using the previous laboratory measurement. The historical bias value 118 may be stored in the memory circuitry 38. The biasing logic 96 may include selection logic 122 configured to select an appropriate filtering factor 124 based upon the direction of the prediction error 116. Accordingly, the selected filtering factor 124 may control how heavily the prediction error is emphasized in the resulting biasing factor 120 computed by the biasing logic 96. For instance, if the prediction error 116 is in the weaker direction for internal bond (e.g., the laboratory measurement 30 is less than the raw prediction 112), a larger filtering factor 124 may be selected as opposed to a condition where the prediction error 116 is in the stronger direction (e.g., the laboratory measurement 30 is greater than the raw prediction 112). To provide one example, the selection logic 122 may output a high filtering factor of 0.6 if the prediction error 116 is in the weaker direction and a low filtering factor of 0.4 if the prediction error 116 is determined to be in the stronger direction.

Once the filtering factor 124 is determined, the prediction error 116, the filtering factor 124, and the historical bias value 118 may be provided to the bias calculation logic 126 for computing the biasing factor 120. In a presently contemplated implementation, the biasing factor 120 may be calculated as the sum of the weighted prediction error 116 and the weighted historical bias value 118. By way of example only, one computational method for calculating the biasing factor 120 may be represented by the following equation:

$$\text{Bias}_{new} = \alpha(E) + (1-\alpha)(\text{Bias}_{old}),\qquad\text{(Equation 1)}$$

wherein $\alpha$ represents the bias filtering factor selected by the selection logic 112, wherein E represents the raw prediction error 116, wherein $\text{Bias}_{old}$ represents the previous bias value 118, and wherein $\text{Bias}_{new}$ represents the computed biasing factor 120. Thus, by way of example, using the filtering coefficients 0.4 and 0.6 discussed above, where the prediction error 116 is determined to be in the weaker direction, the value for a may be selected as 0.6. Accordingly, the computed value of $\text{Bias}_{new}$ may emphasize the prediction error more heavily than the historical bias value 118. Further, where the prediction error 116 is determined to be in the stronger direction, the value for a may be selected as 0.4 and thus the computed value of $\text{Bias}_{new}$ may emphasize the historical bias value 118 more heavily than the prediction error 116. In this manner, the biasing factor 120 computed by the bias calculation logic 126 asymmetrically emphasizes the prediction error value 116 more heavily when the error indicates that the laboratory measurement 30 of internal bond is lower than the model prediction 112 and emphasizes the prediction error value 116 less when the error indicates that the laboratory measurement 30 is greater than the model prediction 112. Further, it should be understood that the filtering factor values of 0.6 and 0.4 are intended to provide an example of one possible implementation. In practice, depending on the reliability of the off-process testing procedure, the filtering values may be higher or lower. For instance, if the off-process testing procedure is generally reliable (e.g., has a high degree of repeatability and is reproducible) a high filtering factor of 0.9 and a low filtering factor of 0.7 may be used. If the off-process test is not as reliable, then the filtering values may be lowered. For example, in the case where the off-process test is less reliable, the high filtering factor may be 0.4 and the low filtering factor may be 0.2. Additionally, while the biasing factor 120 described in the present embodiment is determined based at least partially upon the historical bias value, it should be understood that alternate implementations may calculate biasing factors independently of historical bias values.

Returning to FIG. 4, the raw predicted internal bond value 112 is biased by the combining logic 128 using the biasing factor 120 determined by the bias calculation logic 126 to produce the biased or adjusted predicted value of the internal bond parameter 130. As will be appreciated, the combining logic 128 may be configured to implement addition or multiplicative correction. The biased prediction value 130 may then be provided to the dynamic predictive control model 98 which may be configured to control the internal bond parameter based upon the biased prediction 130. As discussed above, a dynamic predictive model 98 may be configured to generate control actions for manipulating one or more aspects of the process 52 in order to bring certain control variables to a particular desired target set point or objective. Here, the dynamic predictive model 98 may evaluate the biased internal bond prediction 130 with respect to the target internal bond set point 104 discussed above, which reflect a desired minimum internal bond strength required to produce a paper product 60 that conforms to target quality specifications. In some implementations, the desired internal bond set point 104 may be defined as a window or range of values which may still produce an acceptable product. Accordingly, if it is determined by the dynamic predictive model 98 that the biased internal bond prediction 130 deviates from the target set point 104, the dynamic predictive model 98 may generate the appropriate control outputs 102, 106, and 108, which may be provided by the control system 94 to the paper machine 58, the broke system 54 and the stock blending system 56, respectively. Additionally, based on the asymmetrical control mechanism provided by the biasing logic 96 in determining the biasing factor 120, deviations in the weaker direction of internal bond are effectively corrected more quickly by the control model 98 due to the higher emphasis of the prediction error that is reflected in the biased internal bond prediction 130.

Figure 6A:
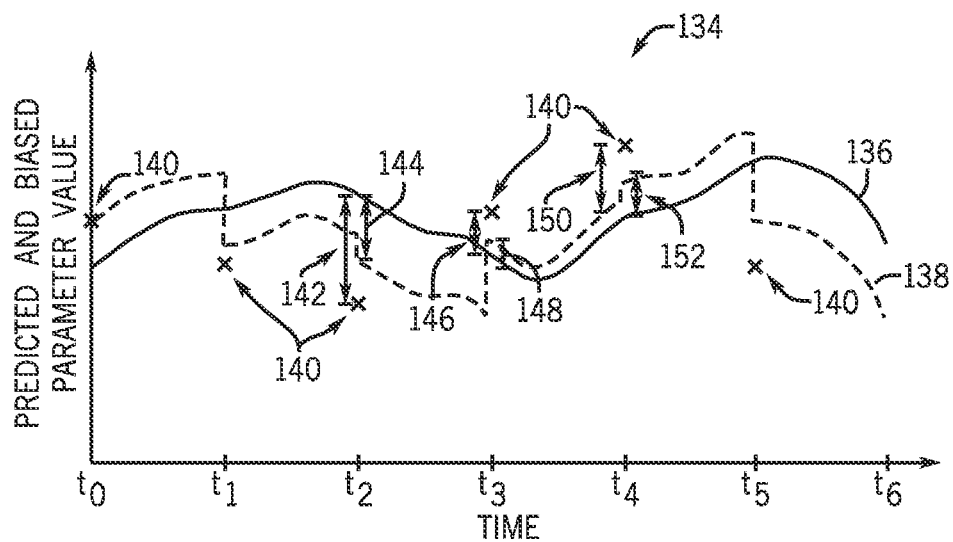
FIG. 6A is a graphical representation illustrating the biasing of an inferential model prediction using a conventional control system.
Figure 6B:
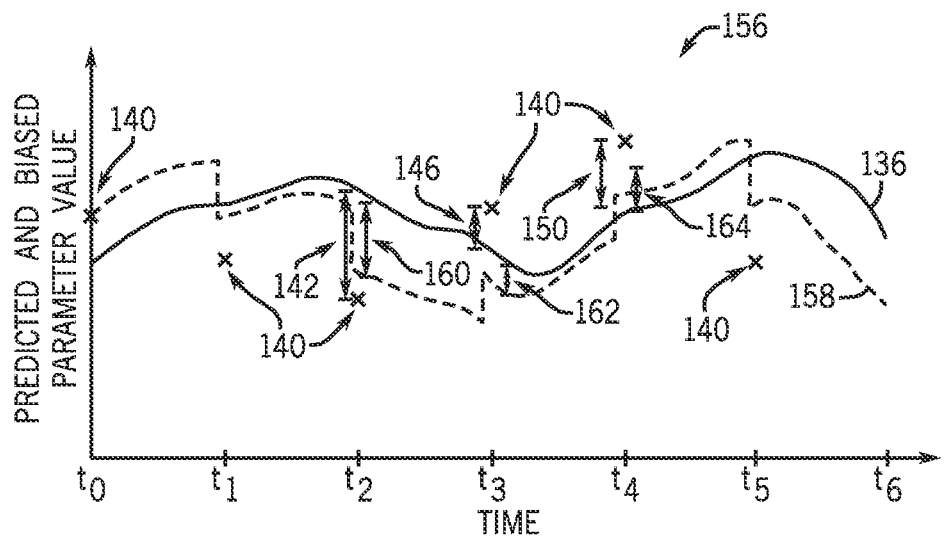
FIG. 6B is a graphical representation illustrating the asymmetric biasing of a inferential model prediction in accordance the asymmetrical control techniques depicted in FIGS. 4 and 5.

FIGS. 6A and 6B provide a graphical representation 134 showing the control of a process parameter without the asymmetrical control mechanisms discussed above and a graphical representation 156 showing the control of a process parameter using the asymmetrical control techniques discussed above, respectively. Referring first to FIG. 6A, the graph 134 includes an x-axis representing time and a y-axis representing the value of a process parameter in appropriate units. For instance, in the case of internal bond, the y-axis may represent values in $J/m^2$. The trace line 136 represents the raw prediction values (e.g., 112) and the trace line 138 represents the biased prediction values (e.g. 130) determined during an interval of the process defined by the control interval $t_0$ to $t_6$. During the process, laboratory measurements (e.g., 30) of internal bond, represented here by the reference numbers 140, may be periodically provided to the control system 94.

As shown in FIGS. 6A and 6B, the laboratory measurements 140 are provided at each of the times $t_0$, $t_1$, $t_2$, $t_3$, $t_4$, $t_5$, and $t_6$. Based upon a biasing factor calculated based on a prediction error defined by the laboratory measurements 140, the raw prediction curve 136 may be biased, thus producing the biased prediction curve 138. Further, as will be understood, the biasing factor may be periodically updated upon the receipt of each new laboratory measurement 140. For instance, at $t_0$, an initial laboratory measurement 140 may be received and a biasing factor may be computed based upon the prediction error between the laboratory measurement 140 and the raw prediction at $t_0$. By way of example only, the conventional control techniques depicted in FIG. 6A may filter the prediction error using Equation 1 above, but in such a manner that the filtering factor has a value of 0.5 regardless of the direction of the prediction error. Referring now to the initial interval $t_0$ to $t_1$, the time $t_0$ may represent the start of a process or a grade change. Therefore, from the interval defined by $t_0$ to $t_1$ on the graph 134, a historical bias value may not be available, and a filtering value of unity (e.g., 1) may be used. Thus, as shown in the graph 134, the biasing factor determined for the interval $t_0$ to $t_1$ may be equivalent to the prediction error between the raw prediction curve 136 and the laboratory measurement at $t_0$, as indicated by the biased prediction curve 138.

At $t_1$, a new laboratory measurement 140 may be received, and the biasing factor may be updated accordingly. For example, the measurement at $t_1$ indicates that laboratory measurement is lower than the raw prediction curve 138. Accordingly, the biasing factor may be updated reflect a biasing factor that is equivalent to half of the prediction error at $t_1$ and half of the previous biasing value from $t_0$ to $t_1$, and may be implemented through the control interval defined by $t_1$ to $t_2$, as indicated by the biased prediction curve 130. As will be appreciated, the computation of the biasing factor in FIG. 6A for each of the control intervals between the lab measurement 140 may be performed in a similar manner. For example, as shown at $t_2$, a new biasing factor 144 is calculated as being equivalent to half of the prediction error value 142, which is in the weaker direction for internal bond, and half of the previous biasing factor value from $t_1$ to $t_2$. At time $t_3$, the biasing factor may again be updated, as indicated by the reference numeral 148, and is equivalent to half of the prediction error 146 calculated at $t_3$, which is in the stronger direction for internal bond, and half of the previous biasing factor 144. Further, the biasing factor 152 determined at $t_4$ is equivalent to half of the prediction error 150 at $t_4$, which is also in the stronger direction for internal bond, and half of the previous biasing factor 148. In other words, the conventional control algorithm depicted FIG. 6A applies the same symmetric filtering regardless of the direction of the prediction error.

Referring now to FIG. 6B, the graph 156 depicts the same raw prediction curve 136, but implements the asymmetric biasing control techniques, as shown by the biased prediction curve 158. As discussed above, in one implementation, the calculation of a biasing factor may be determined as a weighted function of a current prediction error and a previous bias value (e.g., calculated using the previous laboratory measurement). Thus, the present implementation may wait for an initial control interval to pass before the asymmetric biasing is initiated. For example, referring to the graph 156, $t_0$ may represent the start of a process or a grade change. Therefore, from the interval defined by $t_0$ to $t_1$, a historical bias value may not be available. In one embodiment, the filtering selection logic 122 discussed above may select a filtering value of unity (e.g., 1) when no historical bias values are available. Thus, as shown in the present figure, the biasing factor determined for the interval $t_0$ to $t_1$ may be equivalent to the prediction error between the raw prediction curve 136 and the laboratory measurement at $t_0$.

At $t_1$, the biasing factor may be updated using the new laboratory measurement 140, which indicates a prediction error in the weaker internal bond direction. Thus, the computed biasing factor may emphasize the prediction error at $t_1$ more heavily by selecting the higher filtering factor (e.g., 0.6). Accordingly, referring to the Equation 1 above by way of example, the biasing factor for the period $t_1$ to $t_2$ may be a computed by summing the prediction error at $t_1$ weighted by the filtering factor 0.6 ($\alpha$) and the previous bias value from the interval $t_0$ to $t_1$ weighted by a value of 0.4 (e.g., 1-$\alpha$). That is, the biasing factor for the period $t_1$ to $t_2$ places a stronger emphasis on the prediction error at $t_1$ due to the direction of the error being in the weaker internal bond direction. It should be noted that although the biasing factor shown in the graph 156 for the interval $t_1$ to $t_2$ reflects a heavier emphasis on the negative prediction error at $t_1$, this biasing factor is less than the corresponding biasing factor of the graph 134 of FIG. 6A. This is due to the fact that the biasing value from $t_0$ to $t_1$ in the graph 154, which represents the historical biasing value used in determining the biasing factor for the subsequent interval (e.g., $t_1$ to $t_2$), is greater than the biasing factor in the corresponding interval of the graph 134.

The computation of the biasing factor in FIG. 6B for each of the control intervals between the lab measurements 140 may be performed in a similar manner. For instance, continuing now to $t_2$, the prediction error 142 between the laboratory measurement 140 and the prediction curve 136 is again in the weaker internal bond direction. Thus, based on the asymmetric control implemented by the biasing logic 96, the higher filtering factor (e.g., $\alpha=0.6$) may be selected and an updated biasing factor 160 may be determined using the higher filtering factor, the prediction error 142, and the previous biasing value from the interval $t_1$ to $t_2$ weighted by a factor of $1-\alpha$. As shown in the present figure, the updated bias factor 160, which may be implemented during the control period $t_2$ to $t_3$, has a greater magnitude compared to the corresponding biasing factor 144 in FIG. 6A due to the increased emphasis on the prediction error 142.

Continuing to $t_3$, the laboratory measurement 140 indicates a prediction error in the stronger internal bond direction. As discussed above, in this situation, the lower filtering factor may be selected by the biasing logic 96. For instance, referring to the examples provided above, a lesser filtering factor may have a value of 0.4. Thus, the updated biasing factor 162 may place a lesser emphasis on the current prediction error 146 and a greater emphasis on the previous biasing factor 160. It should be noted that the resulting biasing factor 162 reflects a bias in the negative direction, which is the opposite of the corresponding positive direction biasing factor 148 in FIG. 6A. Indeed, this is a result of the asymmetrical bias control mechanism of the present technique placing a heavier emphasis on the previous biasing factor 160, which is in the negative direction with respect to the raw prediction curve 138 and has a higher magnitude than the current biasing factor 162. Next, the laboratory measurement 140 at $t_4$ again indicates a prediction error 150 in the stronger internal bond direction. Thus, the biasing logic 96 may compute the updated biasing factor 164 using the lower filtering factor, as discussed above. As shown here, the resulting biasing factor 164 for the interval $t_4$ to $t_5$ may have a lesser magnitude compared to the corresponding biasing factor 162 in FIG. 6A due to the lower emphasis on the positive prediction error 150 and a greater emphasis on the previous biasing factor 162, which is in the negative direction. Finally, at $t_5$, the laboratory measurement 140 may indicate a prediction error in the weaker internal bond direction, in which case the biasing factor for the interval $t_5$ to $t_6$ may be computed placing a more emphasis on the prediction error at $t_5$ and less emphasis on the previous biasing factor 164. Thus, the graph 156 depicts how the present control technique favors controlling an asymmetric parameter more aggressively if there is an indication that a laboratory measurement is lower than the predicted value in order to prevent the production of a product that fails to meet a minimum target specification. Further, while the production of a product that exceeds a minimum required target specification may incur additional marginal costs, these costs are generally relatively low compared to the operational, materials, and labor costs expended in producing a rejected product.

Figure 7A:
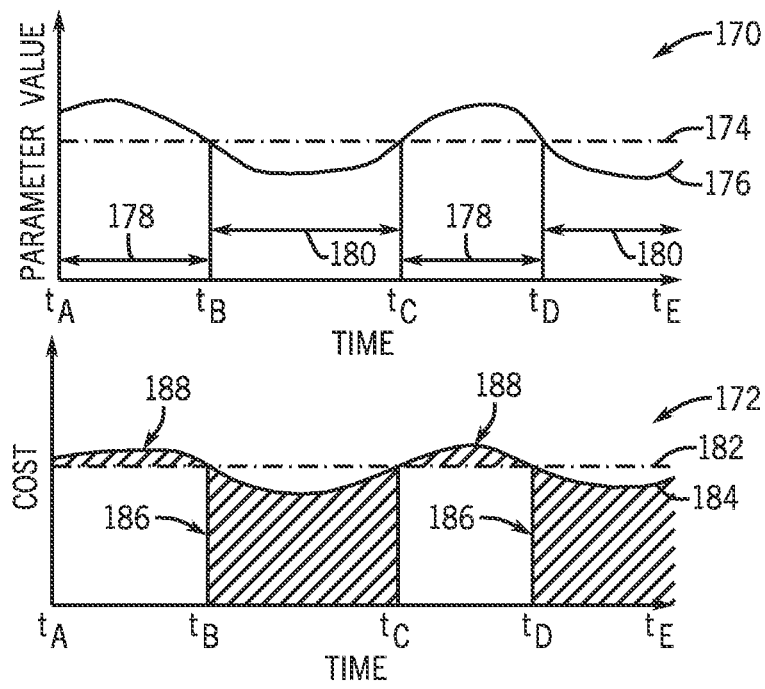
FIG. 7A is a graphical representation illustrating the control of a process parameter using the biasing techniques set forth in FIG. 6A.
Figure 7B:
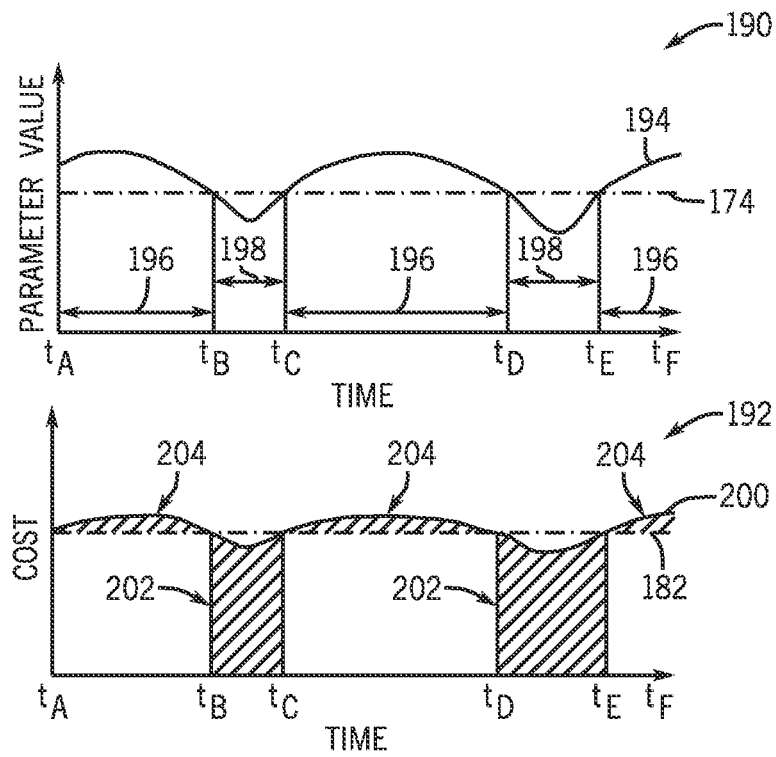
FIG. 7B is a graphical representation illustrating the control of a process parameter using the asymmetrical biasing techniques set forth in FIG. 6B.

Continuing to FIGS. 7A and 7B, the control of a process parameter, such as internal bond, using the presently described techniques is illustrated. Referring first to FIG. 7A, the control of internal bond without the asymmetrical biasing techniques discussed above is illustrated by the graph 170. FIG. 7A also illustrates a corresponding cost function graph 172. The graphs 170 and 172 each include an x-axis representing time. The graph 170 further includes a y-axis representing the value of internal bond in appropriate measurement units (e.g., $J/m^2$) and the graph 172 includes a y-axis representing the cost of production (e.g., dollars). The dashed trace line 174 may represent a target set point (e.g., 104) for internal bond, which may represent a minimum strength value that a paper product must meet. The trace line 176 represents the control of internal bond by a control model. As shown here, during the intervals 178 (e.g., $t_A$ to $t_B$; $t_C$ to $t_D$), the controlled internal bond parameter is above the minimum target 174. As discussed above, though these values may not be optimal, in the context of paper manufacturing, producing a stronger product may be preferred over producing a rejected product. For example, referring to the graph 172, a production cost curve 184 corresponding to the control period depicted in the graph 170 is illustrated. The dashed trace line 182 represents a target desired cost for producing a paper product meeting internal bond specifications. As shown in the intervals $t_A$ to $t_B$ and $t_C$ to $t_D$ where internal bond exceeds the target value 174, the product cost marginally correspondingly exceeds the target cost value 182. Thus, the areas 188 defined between the cost curve 184 and the target curve 182 in the intervals $t_A$ to $t_B$ and $t_C$ to $t_D$ may represent the marginal additional costs incurred by producing a paper product having a slightly higher internal bond value than specified by the target 174.

Referring again to the graph 170, the intervals 180 (e.g., $t_B$ to $t_C$; $t_D$ to $t_E$) represent control intervals in which the internal bond parameter is below the minimum target 174, and must be increased towards the target set point 174. That is, the product produced in the intervals 180 represent products that fail to meet the minimum target quality specification. Referring again to the graph 172, the costs of producing the rejected products are shown by the reference numerals 186. Thus, compared to the marginal costs 188 of producing a product that exceeds the target parameter, the sunk costs 186, which may represent operation, materials, and/or labor costs, associated with producing the rejected product is substantially higher. In certain paper processes, the rejected paper may be recycled using the broke system 54, thus at least partially recouping some of the sunk materials costs 186. Nevertheless, the overall loss of resources in producing a rejected product is generally avoided in favor of producing a product that exceeds the target set point for a relatively small additional cost 188 that still conforms to industry quality specifications.

Further, it should be noted that the control of the internal bond parameter is performed in FIG. 7A without using the asymmetrical control techniques set forth herein. For instance, as illustrated in the graph 170, the internal bond value is generally controlled in a symmetrical manner regardless of whether internal bond value is greater than or lower than the target set point. However, due to the high costs 186 associated with the production of a rejected product, it may be desirable to control internal bond more aggressively where it is determined that the parameter is below the target threshold 174. Accordingly, the asymmetrical control techniques set forth in the present disclosure provides an advantage and improvement to the conventional control techniques of FIG. 7A in this regard.

Referring now to FIG. 7B, the control of internal bond using the asymmetrical biasing techniques discussed above is illustrated by the graph 190 and a corresponding production cost graph 192. The trace line 194 represents the control of internal bond by the dynamic predictive model 98 based upon the biased prediction values 130 determined by the inferential model 94 and the biasing logic 96 using the biasing factors 120. As discussed above, the biasing logic 96 is configured to emphasize prediction errors more heavily in one direction. For instance, a prediction error indicating that a internal bond laboratory measurement is lower than a predicted value may be filtered using a higher filtering factor, thus placing a greater weight or emphasis on the biasing factor 120 produced by the biasing logic 96. Accordingly, as shown in FIG. 7B, the control of internal bond in the time intervals 198 (e.g., $t_B$ to $t_C$; $t_D$ to $t_E$) are driven back towards the target set point 174 more quickly compared to the corresponding intervals 180 in FIG. 7A. Further, where the internal bond values are above the target value 174 control of the parameter is also performed less, though less heavily as the resulting above-specification product is still acceptable.

Referring to the production cost graph 192, the trace line 200 represents the production costs corresponding to the graph 190. As shown here, the sunk costs, represented by the areas 202 between the time axis and the cost curve 200, incurred in producing the rejected product during the intervals 198 is substantially lower than the sunk costs 186 incurred in controlling internal bond in FIG. 7A without the asymmetrical control techniques. Additionally, the marginal costs 204 of producing a product that exceeds the internal bond target 174, is still relatively minute compared to the cost of producing the rejected product during the intervals 198.

While the above examples have generally described the asymmetric control of strength parameters in the context of paper manufacturing, it should be appreciated that the present technique may be applicable in controlling various types of asymmetrical process parameters in any suitable process system. For example, the present technique may be applicable in controlling the manufacturing of rubber or plastics that must meet a certain minimum elasticity threshold, the production of bio-fuels that must meet a certain minimum ethanol content threshold, or the production of a liquid product that must meet a certain minimum viscosity level, to name just a few. Further, it should be noted that the asymmetrical parameter control techniques may be implemented in either direction. That is, rather than controlling an asymmetrical parameter more aggressively to meet a minimum threshold, the present technique may also provide for asymmetric control where a parameter must not exceed a maximum target. For instance, even in certain paper products, strength parameters may be asymmetrically controlled in an opposite manner relative to the examples provided above. In the manufacturing of bathroom tissue, for instance, it is generally preferable not to produce too strong of a product, such as to ensure that the product always tears easily along its perforations. In this situation, when a laboratory measurement is greater than the prediction value, the prediction error may be weighted more heavily by using a higher filtering factor. Similarly, where the prediction error is in the weaker direction, a lower filtering factor may be used in the determination of the biasing factor.

Further, while the above-provided examples generally discuss selecting the filtering factor from either a higher (e.g., 0.6) and a lower (e.g., 0.4) filtering factor depending on a direction of a prediction error, additional embodiments may incorporate mechanisms to further take into account the magnitude of the prediction error in addition to the direction. In one contemplated embodiment, a higher and lower set of filtering factors may each include a plurality of filtering values. For example, a prediction error that is relatively small in the weaker internal bond direction may correspond to a filtering factor of 0.6, as discussed above. Further, where the internal bond prediction error is in the weaker direction, but has a relatively large magnitude, a filtering factor of 0.7 may be selected. Thus, in such embodiments, more than two filtering factors may be provided and selected based on a gradient sliding scale of the magnitude of a prediction error, as well as the direction of the error.

Referring now to FIG. 8, exemplary logic 210 for performing the asymmetrical biasing techniques generally described in FIGS. 4 and 5 is illustrated. The logic 150 may be implemented by the processing circuitry 36 discussed above with reference to FIG. 2. Further, although the logic 210 will be described below with reference to the control of internal bond in the context of paper manufacturing processes, it should again be appreciated that the techniques set forth in FIG. 8 may be applicable to any suitable manufacturing process requiring in which the asymmetric control of a process parameter is required.

The logic 210 may begin by receiving MV's and/or DV's from the process at step 212. As discussed above, the MV's and DV's 100 may be measured or derived from the paper process system 52 through the use of the sensors 24. At step 214, a raw predicted value of internal bond may be derived using the MV's and DV's acquired in step 212 by using an inferential model operating as a virtual sensor. For example, step 212 may include the use of the quality parameter model 94 discussed above in deriving a raw internal bond prediction 112. At step 216, a determination may be made as to whether an off-process measurement is available. If an off-process measurement of internal bond is not available, then the logic 210 may proceed to step 218, wherein the raw internal bond prediction from step 214 is biased using a current biasing factor. As discussed above, the current biasing factor may have been calculated based on a previous off-process/laboratory measurement, if no historical laboratory measurements are available, may be initially set to unity (e.g., 1). Using the biasing factor at step 218, an adjusted or biased prediction (e.g., 130) may be obtained. At step 220, the biased prediction value may then be provided to a dynamic predictive control model (e.g., 98) to implement control actions in the process system for controlling the asymmetric parameter. For instance, as described above, the dynamic predictive model 98 may output the control actions 102, 106, and 108 to adjust of one or more of the MV's received at step 212 with the desired effect of bringing the internal bond value towards a target set point, range, or upper/lower limit (e.g., 104).

If, at step 216, a laboratory or off-process measurement is available, as indicated by reference number 222, the biasing factor used in step 218 may be updated. For instance, the off-process measurement may provide an actual measured value of internal bond performed using one or destructive tests on a sample of a finished product. Once it is determined that an off-process measurement is available, the logic 210 may proceed to step 224, in which the off-process measurement is compared with the raw internal bond prediction value from step 214 to determine a prediction error.

Continuing to decision step 226, a determination may be made based upon the direction of the prediction error obtained in step 224 as to whether the direction of the prediction error is in a less tolerable direction with respect to the asymmetric internal bond limits. For instance, in the paper manufacturing examples provided in FIGS. 3-5, the imposed limit may be defined such that the internal bond value must at least meet a target minimum threshold. That is, values which exceed the minimum are acceptable to a certain extent, though they may not represent the optimal process conditions (e.g., incurring marginal costs). Accordingly, in this case, the less tolerable direction may be defined as when the prediction error is in the negative direction (e.g., the laboratory measurement is lower than the predicted value). Additionally, the opposite scenario may also be applicable, such as where a paper product (e.g., bathroom tissue) must not exceed a maximum strength parameter. In this scenario, the less tolerable direction may be defined as when the prediction error is in the positive direction (e.g., the laboratory measurement exceeds the predicted value). Thus, it should be understood in determining which direction constitutes a less tolerable direction, the asymmetric nature of the parameter must be known or defined. (e.g., whether the parameter is to stay above a minimum target or stay below a maximum target).

Once the direction of the prediction error is determined, an appropriate filtering factor may be selected at steps 228 and 230. As discussed above, the filtering factor may be selected by the selection logic 122 of the biasing circuitry 96. If the determination at step 226 indicates that the direction of the prediction error is in the less tolerable direction, a higher filtering factor (e.g., 0.6) may be selected at step 228 to achieve more aggressive biasing of the raw prediction value. If the determination at step 226 indicates that the direction of the prediction error is not in the less tolerable direction, then a lower filtering factor (e.g., 0.4) may be selected at step 230. The selected filtering factor may then be provided to step 232 for computing an updated biasing factor for asymmetrical control. As discussed above, depending on the filtering factor selected at either step 228 or step 230, the prediction error will be either more heavily or less heavily emphasized in the computed biasing factor. Further, in a presently contemplated embodiment, the biasing factor may be determined as a function of both a current prediction error and a historical previous biasing factor (e.g., calculated using the previous laboratory measurement). By way of example, such a function is illustrated above with reference to Equation 1. Thereafter, the updated biasing factor is provided to step 218, in which the raw internal bond prediction from 214 is adjusted using the biasing factor to produce an adjusted or biased prediction (e.g., 130). The biased prediction value may then be provided to a dynamic predictive control model (e.g., 98) to implement control actions in the process system for controlling the asymmetric parameter. For instance, as described above, the dynamic predictive model 98 may output the control actions 102, 106, and 108 to adjust of one or more of the MV's received at step 212 with the desired effect of bringing the internal bond value towards a target set point, range, or upper/lower limit (e.g., 104). The control of the process using the biasing factor determined at step 232 may continue by returning to step 212, where new MV and DV values are received. Additionally, if a subsequent off-process measurement is available, the biasing factor may then be updated by repeating the steps 224-232.

While the above techniques have been described primarily with reference to the asymmetric control of a paper quality parameter, it should be understood that the present invention is not intended to be limited in this regard. Indeed, the presently described techniques may be suitable for use in a number of various processes for providing asymmetric control of any parameter having an asymmetrical characteristic, as discussed above. Further, it should be understood that the techniques described herein may be implemented in any suitable manner, including hardware-based circuitry or a computer program having executable code stored on one or more tangible computer-readable media. The techniques described herein may also be implemented using a combination of both hardware and software elements, as will be appreciated by those skilled in the art.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
   estimating a process parameter value, wherein the estimated process parameter value comprises an inferred value component and a biasing value component;
   comparing the estimated process parameter value to a desired value;
   using a first filtering factor to obtain the biasing value component if the estimated process parameter value deviates from the desired value in a first direction, and using a second filtering factor to obtain the biasing value component if the estimated process parameter value deviates from the desired value in a second direction opposite the first direction; and
   outputting, from a computer, a control value representative of a control output for controlling a process based at least in part on the biasing value component.

2. The method of claim 1, wherein using the first filtering factor to obtain the biasing value component includes driving the estimated process parameter value more aggressively towards the desired value than using the second filtering factor to obtain the biasing value component.

3. The method of claim 2, wherein estimating the process parameter value comprises using an inferential model to determine the inferred value component.

4. The method of claim 3, wherein the estimated process parameter value is determined by biasing the inferred value component using the biasing value component.

5. The method of claim 4, wherein the biasing value component is determined as a function of a prediction error between the inferred value component and a measured value of the process parameter value.

6. The method of claim 5, wherein using the first filtering factor to obtain the biasing value component comprises applying the first filtering factor to the prediction error, and wherein using the second filtering factor to obtain the biasing value component comprises applying the second filtering factor to the prediction error.

7. The method of claim 6, wherein the prediction error has a greater weight in the biasing value component if the first filtering factor is used to obtain the biasing value component than if the second filtering factor is used to obtain the biasing value component.

8. The method of claim 1, wherein the first filtering factor is different than the second filtering factor.

9. A method, comprising:
   determining an estimation for a parameter of a paper product produced by a paper manufacturing process, wherein the estimated paper product parameter comprises an inferred value component and a biasing value component;
   comparing the estimated paper product parameter to a desired value;
   using a first filtering factor to obtain the biasing value component if the estimated paper product parameter deviates from the desired value in a first direction, and using a second filtering factor to obtain the biasing value component if the estimated paper product parameter deviates from the desired value in a second direction opposite the first direction; and
   outputting, from a computer, a control value representative of a control output for controlling the paper manufacturing process based at least in part on the biasing value component.

10. The method of claim 9, wherein using the first filtering factor to obtain the biasing value component includes driving the estimated paper product parameter more aggressively towards the desired value than using the second filtering factor to obtain the biasing value component.

11. The method of claim 9, wherein estimating the paper product parameter comprises using an inferential model to determine the inferred value component.

12. The method of claim 11, wherein the paper product parameter is estimated by biasing the inferred value component using the biasing value component.

13. The method of claim 12, wherein the biasing value component is determined as a function of a prediction error between the inferred value component and a measured value of the estimated paper product parameter.

14. The method of claim 13, wherein using the first filtering factor to obtain the biasing value component comprises applying the first filtering factor to the prediction error, and wherein using the second filtering factor to obtain the biasing value component comprises applying the second filtering factor to the prediction error.

15. The method of claim 14, wherein the prediction error has a greater weight in the biasing value component if the first filtering factor is used to obtain the biasing value component than if the second filtering factor is used to obtain the biasing value component.

16. The method of claim 9, wherein the estimated paper product parameter comprises an internal bond strength parameter of the produced paper product.

17. The method of claim 9, wherein the first filtering factor is different than the second filtering factor.

18. A method, comprising:
   estimating a value of a process parameter of a produced product, wherein the estimated process parameter value comprises an inferred value component and a biasing value component, wherein the biasing value component is determined based at least partially upon a prediction error between the inferred value component and a measured value of the process parameter;
   comparing the estimated process parameter to a desired value;
   using a first filtering factor to obtain the biasing value component if the estimated process parameter value deviates from the desired value in a first direction, and using a second filtering factor to obtain the biasing value component if the estimated process parameter value deviates from the desired value in a second direction opposite the first direction; and
   outputting, from a computer, a control value representative of a control output for controlling a process based at least in part on the biasing value component.

19. The method of claim 18, wherein the produced product comprises a produced paper product.

20. The method of claim 19, wherein the estimated process parameter value of the produced product comprises an internal bond strength parameter of the produced paper product.

21. The method of claim 18, wherein estimating the process parameter value comprises using an inferential model to determine the inferred value component.

22. The method of claim 21, wherein the process parameter value is estimated by biasing the inferred value component using the biasing value component.

23. The method of claim 18, wherein the first filtering factor is different than the second filtering factor.

* * * * *